(12) United States Patent
Autry

(10) Patent No.: US 12,330,101 B2
(45) Date of Patent: Jun. 17, 2025

(54) FORMING A FRACTIONATED CANNABIS CONCENTRATE

(71) Applicant: John G. Autry, Austin, TX (US)

(72) Inventor: John G. Autry, Austin, TX (US)

(*) Notice: Subject to any disclaimer, the term of this patent is extended or adjusted under 35 U.S.C. 154(b) by 394 days.

(21) Appl. No.: 18/093,839

(22) Filed: Jan. 6, 2023

(65) Prior Publication Data
US 2023/0219024 A1      Jul. 13, 2023

Related U.S. Application Data

(60) Provisional application No. 63/297,664, filed on Jan. 7, 2022.

(51) Int. Cl.
| | |
|---|---|
| *A24B 15/16* | (2020.01) |
| *A23L 33/105* | (2016.01) |
| *A24B 15/30* | (2006.01) |
| *B01D 3/14* | (2006.01) |
| *B01D 43/00* | (2006.01) |

(52) U.S. Cl.
CPC ............ *B01D 43/00* (2013.01); *A23L 33/105* (2016.08); *A24B 15/16* (2013.01); *A24B 15/303* (2013.01); *B01D 3/14* (2013.01)

(58) Field of Classification Search
CPC .............................. A24B 15/16; A24B 15/303
See application file for complete search history.

(56) References Cited

PUBLICATIONS

Bottle Jack Rosin Press User Guide, Dabpress Team, https://www.dabpress.com/blogs/user-guide/complete-rosin-press-machine?srsltid=AfmBOorIBM1CIFvOHRXNSqZwOIII7xwZ-2-T-JyEp9ru3HqSfOTNIBB8 (Year: 2019).*
Best Micron For Flower, Hash Or Kief/Sift Rosin (Ideal Bag Sizes), Grow Light Central, https://web.archiveorg/web/20220122124747/https://growlightcentral.com/blogs/news/best-micron-for-flower-kief-hash-sift-rosin (Year: 2022).*
Dry Sifting to Hashish Pressing, THC Famer, https://www.thcfarmer.com/threads/dry-sifting-to-hashish-pressing.137170/page-3 (Year: 2022).*

* cited by examiner

*Primary Examiner* — Russell E Sparks
(74) *Attorney, Agent, or Firm* — Jeffrey L. Streets

(57) ABSTRACT

A fractionated cannabis concentrate, consumable product containing the fractionated cannabis concentrate, and a method for producing the fractionated cannabis concentrate. The method may include pressing dried cannabis through a first filter having a first pore size of between about 90 and 100 micrometers under a first set of temperature and pressure conditions, collecting a cannabis concentrate released from the dried cannabis and passed through the first filter as a result of the pressing, and fractionating the cannabis concentrate by pressing the cannabis concentrate through a second filter having a second pore size from about 15 to 40 micrometers under a second set of temperature and pressure conditions until a liquid emerges through the second filter leaving a fractionated cannabis concentrate on the second filter. The fractionated cannabis concentrate may be suspended in an edible carrier oil and decarboxylated prior to use in an edible product, tincture or inhalation system.

18 Claims, 4 Drawing Sheets

Hemp Quality Assurance Testing
CERTIFICATE OF ANALYSIS
REFINED HEMP ROSIN HEAVY THC

CANNABINOID TEST RESULTS

🌿 Cannabinoid Analysis

Tested by high-performance liquid chromatography with diode-array detection (HPLC-DAD)

Method: QSP 1157 - Analysis of Cannabinoids by HPLC-DAD

TOTAL THC: 52.725%
Total THC ($\Delta$9THC+0.877*THCa)

TOTAL CBD: 13.847%
Total CBD (CBD+0.877*CBDa)

TOTAL CANNABINOIDS: 70.22%
Total Cannabinoids (Total THC) + (Total CBD) + (Total CBG) + (Total THCV) + (Total CBC) + (Total CBDV) + $\Delta$8THC + CBL + CBN TOTAL CBG: 2.14%
Total CBG (CBG+0.877*CBGa)

TOTAL THCV: 0.185%
Total THCV (THCV+0.877*THCVa)

TOTAL CBC: 1.25%
Total CBC (CBC+0.877*CBCa)

TOTAL CBDV: 0.068%
Total CBDV (CBDV+0.877*CBDVa)

| Compound | LOD/LOQ (mg/g) | Measurement Uncertainty (mg/g) | Result (mg/g) | Result (%) |
|---|---|---|---|---|
| THCa | 0.05/0.14 | ±13.198 | 513.54 | 51.354 |
| CBDa | 0.02/0.19 | ±2.873 | 98.40 | 9.840 |
| $\Delta$9THC | 0.06/0.26 | ±2.645 | 76.88 | 7.688 |
| CBD | 0.07/0.29 | ±2.415 | 52.17 | 5.217 |
| CBGa | 0.1/0.2 | ±0.99 | 18.9 | 1.89 |
| CBCa | 0.07/0.28 | ±0.476 | 9.74 | 0.974 |
| CBG | 0.06/0.19 | ±0.190 | 4.81 | 0.481 |
| CBC | 0.2/0.5 | ±0.12 | 4.0 | 0.40 |
| THCVa | 0.07/0.20 | ±0.101 | 2.11 | 0.211 |
| CBDVa | 0.03/0.53 | ±0.023 | 0.78 | 0.078 |
| CBN | 0.1/0.3 | N/A | <LOQ | <LOQ |
| $\Delta$8THC | 0.1/0.4 | N/A | ND | ND |
| THCV | 0.1/0.2 | N/A | ND | ND |
| CBDV | 0.04/0.15 | N/A | ND | ND |
| CBL | 0.06/0.24 | N/A | ND | ND |
| SUM OF CANNABINOIDS | | | 781.3mg/g | 78.13% |

*FIG. 3*

Hemp Quality Assurance Testing
CERTIFICATE OF ANALYSIS
ELEVATED GUMDROP PINEAPPLE MANGO B

CANNABINOID TEST RESULTS

🌿 Cannabinoid Analysis

Tested by high-performance liquid chromatography with diode-array detection (HPLC-DAD)

Method: QSP 1157 - Analysis of Cannabinoids by HPLC-DAD

TOTAL THC: 14.767 mg/unit
Total THC (Δ9THC+0.877*THCa)

TOTAL CBD: 8.179 mg/unit
Total CBD (CBD+0.877*CBDa)

TOTAL CANNABINOIDS:
23.90 mg/unit
Total Cannabinoids (Total THC) + (Total CBD) + (Total CBG) + (Total THCV) + (Total CBC) + (Total CBDV) + Δ8THC + CBL + CBN TOTAL CBG: 0.155 mg/unit
Total CBG (CBG+0.877*CBGa)

TOTAL THCV: <LOQ
Total THCV (THCV+0.877*THCVa)

TOTAL CBC: 0.323 mg/unit
Total CBC (CBC+0.877*CBCa)

TOTAL CBDV: <LOQ
Total CBDV (CBDV+0.877*CBDVa)

| Compound | LOD/LOQ (mg/g) | Measurement Uncertainty (mg/g) | Result (mg/g) | Result (%) |
|---|---|---|---|---|
| Δ9THC | 0.002/0.014 | ±0.1741 | 2.470 | 0.2470 |
| CBD | 0.004/0.011 | ±0.0655 | 1.368 | 0.1368 |
| Δ8THC | 0.01/0.02 | ±0.005 | 0.08 | 0.008 |
| CBC | 0.003/0.010 | ±0.0022 | 0.054 | 0.0054 |
| CBG | 0.002/0.006 | ±0.0016 | 0.026 | 0.0026 |
| THCV | 0.002/0.012 | N/A | <LOQ | <LOQ |
| CBDV | 0.002/0.012 | N/A | <LOQ | <LOQ |
| CBN | 0.001/0.007 | N/A | <LOQ | <LOQ |
| THCVa | 0.002/0.019 | N/A | ND | ND |
| CBDa | 0.001/0.026 | N/A | ND | ND |
| CBDVa | 0.001/0.018 | N/A | ND | ND |
| CBGa | 0.002/0.007 | N/A | ND | ND |
| CBL | 0.003/0.010 | N/A | ND | ND |
| CBCa | 0.001/0.015 | N/A | ND | ND |
| THCa | 0.001/0.005 | N/A | ND | ND |
| SUM OF CANNABINOIDS | | | 4.00 mg/g | 0.40% |

Unit Mass: 5.9785 grams per Unit

| | |
|---|---|
| Δ9THC per Unit | 14.767 mg/unit |
| Total THC per Unit | 14.767 mg/unit |
| CBD per Unit | 8.179 mg/unit |
| Total CBD per Unit | 8.179 mg/unit |
| Sum of Cannabinoids per Unit | 23.91 mg/unit |
| Total Cannabinoids per Unit | 23.90 mg/unit |

*FIG. 4*

FORMING A FRACTIONATED CANNABIS CONCENTRATE

CROSS-REFERENCE TO RELATED APPLICATIONS

This application claims priority to U.S. Provisional Patent Application No. 63/297,664 filed on Jan. 7, 2022, which application is incorporated by reference herein.

BACKGROUND

The present disclosure relates to cannabis products and methods of preparing cannabis products.

BACKGROUND OF THE RELATED ART

The cannabis plant (*Cannabis sativa* L.) ("cannabis") has a long been used for both medicinal and recreational purposes. The same species is also an important source of fibers used for ropes and textiles. Selection by humans has produced many different varieties of cannabis some of which are optimized for fiber production (e.g., hemp) while others are optimized for medicinal uses (e.g., "indica" varieties). Cannabis plant material contains a variety of chemical compounds, including cannabinoids which are largely responsible for the "high" (as well as other physiological effects) associated with cannabis consumption. Virtually all of the cannabinoids in a cannabis plant are present in glandular trichomes which are located on the surfaces of bracts (reduced leaves) and stems associated with the "female" or seed-bearing inflorescences which are often referred to as "buds." Although it is not known why the cannabis plant covers its inflorescences with trichomes replete with cannabinoids and terpenoids, it has been hypothesized that these secondary plant products act as deterrents to discourage insects and other predators from consuming the inflorescence.

BRIEF SUMMARY

Some embodiments provide a method comprising: pressing dried cannabis through a first filter having a first pore size of between about 90 and 100 micrometers at a temperature of about 210° F. at an initial pressure of about 500 psi wherein the initial pressure is gradually increased to about 8,000 psi; collecting a cannabis concentrate released from the dried cannabis and passed through the first filter as a result of the pressing; and fractionating the cannabis concentrate by pressing the cannabis concentrate through a second filter having a second pore size from about 15 to 30 micrometers at a temperature above room temperature and below about 100° F. at a pressure below about 100 psi until a liquid emerges through the second filter leaving a fractionated cannabis concentrate on the second filter.

Some embodiments provide a fractionated cannabis concentrate produced by an embodiment of the method.

Some embodiments provide an edible product comprising an edible carrier oil containing a suspended decarboxylated, fractionated cannabis concentrate produced by an embodiment of the method.

BRIEF DESCRIPTION OF THE SEVERAL VIEWS OF THE DRAWINGS

FIG. 3 shows an analysis of fractionated, concentrated cannabis that was produced according to an embodiment.

FIG. 4 shows an analysis of a candy made from the decarboxylated, fractionated, concentrated cannabis according to an embodiment.

DETAILED DESCRIPTION

Figure 1:
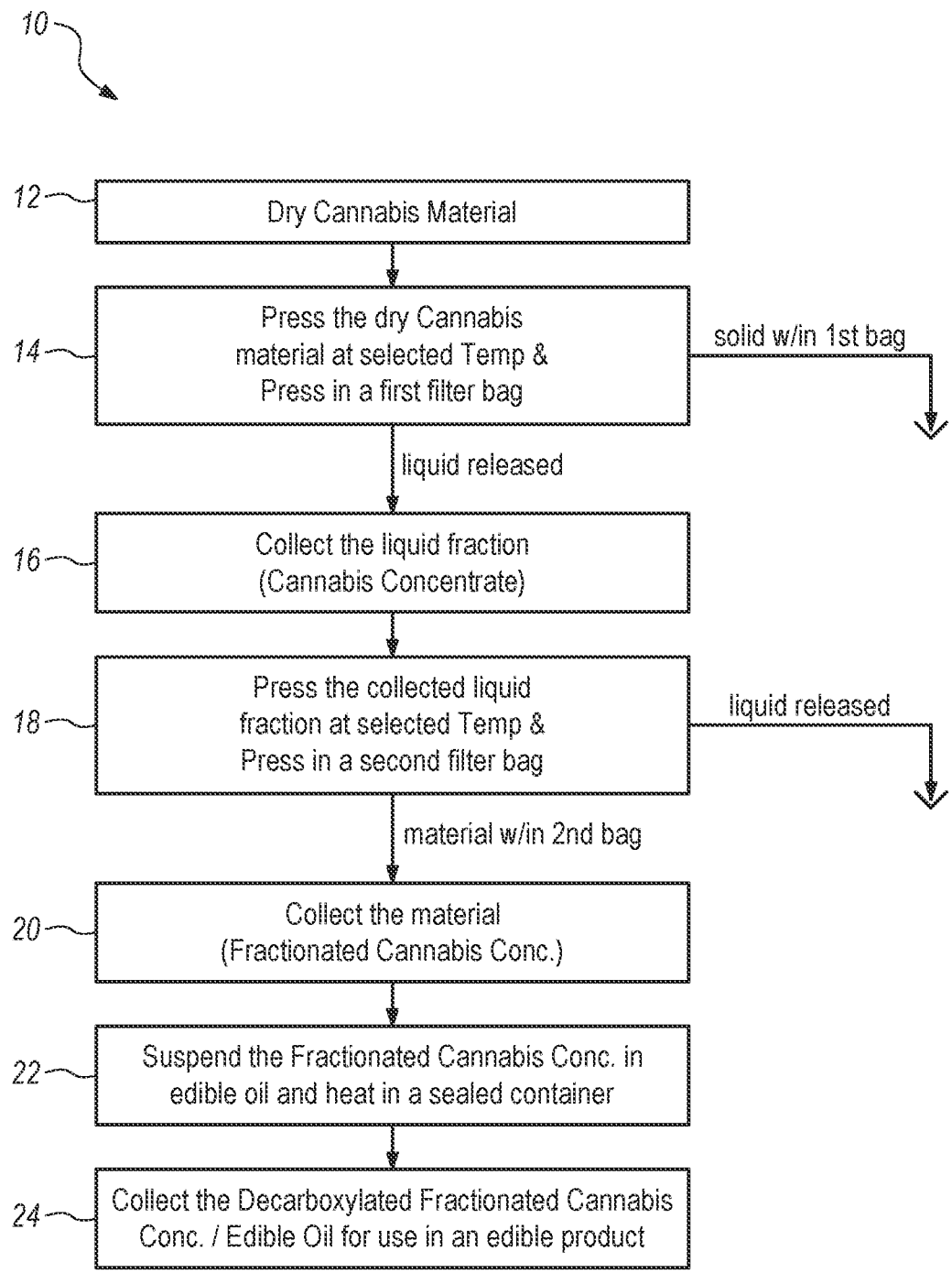
FIG. 1 is a flowchart of a method according to an embodiment.

Some embodiments provide a method comprising: pressing dried cannabis through a first filter having a first pore size of between about 90 and 100 micrometers at a temperature of about 210° F. at an initial pressure of about 500 psi wherein the initial pressure is gradually increased to about 8,000 psi; collecting a cannabis concentrate released from the dried cannabis and passed through the first filter as a result of the pressing; and fractionating the cannabis concentrate by pressing the cannabis concentrate through a second filter having a second pore size from about 15 to 30 micrometers at a temperature above room temperature and below about 100° F. at a pressure below about 100 psi until a liquid emerges through the second filter leaving a fractionated cannabis concentrate on the second filter.

Among the variety of cannabinoids present in cannabis trichomes are tetrahydrocannabinolic acid ("THCA") and tetrahydrocannabivaric acid ("THCVA"). The cannabis plant synthesizes cannabinoids as carboxylic acids which are usually not physiologically active in humans. Accordingly, THCA and THCVA themselves produce few physiological effects when directly ingested, but exposing THCA and THCVA to elevated temperatures, such as those produced when cannabis burns during smoking, causes those compounds to undergo decarboxylation reactions to form psychoactive or other physiologically active compounds. Decarboxylation converts THCA to 1:19 tetrahydrocannabinol ("1:19-THC"), which is psychoactive. Upon heating, THCVA undergoes a similar decarboxylation reaction to form tetrahydrocannabivarin ("THCV"), which has appetite-suppressing effects. Others of the many different cannabinoids present in cannabis show different effects. The trichomes also contain a variety of more or less volatile terpenoids which give different cannabis cultivars distinct aromas and tastes. While there are a few terpenoids found only in cannabis, most of the terpenoids found in cannabis are also found in several other plants where they are believed to act as predator deterrents. The mixture of plant products (cannabinoids and terpenoids) present in cannabis trichomes may be referred to as "resin" or "rosin." Botanically, resin is a usually gooey viscous liquid produced in the resin ducts of a variety of plants-mostly conifers (i.e., pine pitch). If resin is heated to remove volatiles, it hardens into rosin.

Cannabis may be consumed by smoking or by ingestion. The trichomes may be freed from the plant material to provide a product having a higher concentration of active molecules than found in whole cannabis inflorescences. Edible products as well as systems (i.e., vape pens, etc.) may also contain physiologically active cannabis compounds to permit combustion-free inhalation of cannabis compounds. Both edible products and combustion-free inhalation systems generally rely on concentrated "extracts" of cannabis.

Such cannabis concentrates are usually produced by extracting the cannabis compounds from the plant with a solvent, then separating the solvent from the cannabis compounds. The separated cannabinoids may be distilled to yield cannabinoid profiles different from those of the source cannabis plant. Use of such concentrates or extracts removes some of the problems associated with smoking or ingesting plant material. Unfortunately, extracts can create other problems. Not only is the extraction process complex and expensive, but the process can leave traces of difficult-to-remove organic solvents in the final product. Embodiments of the fractionation process described herein provide a technical benefit of producing concentrates and fractionates of cannabis compounds without the use of solvents and without complicated distillation processing.

Some embodiments provide a solvent-free and distillation-free method of concentrating and fractionating cannabinoids from any type of cannabis. The method includes harvesting trichome-bearing female cannabis inflorescences and drying the female cannabis inflorescences to a water content of approximately 10-15% by weight. Portions of the female plant material adjacent the inflorescence may also bear trichomes (albeit at a lower concentration per weight of plant material) and may be used in the methods described herein. It has been found that drying the female cannabis inflorescences to a water content of approximately 10-15 weight percent enables the present filter-based fractionation process to produce suitable amounts of rosin (i.e., the cannabis concentrate) with suitable concentrations of cannabinoids. Drying to a water content below about 10 weight percent results in a much lower and insufficient yield of rosin. Conversely, if the female cannabis inflorescences are processed with a water content above about 15 weight percent, then the rosin has a buttery consistency that is difficult or impossible to collect.

FIG. 1 is a flowchart of a method 10 according to one embodiment. In step 12, a cannabis material is dried. The cannabis material is preferably trichome-bearing female cannabis inflorescences, and the cannabis material is preferably dried to a water content of about 10-15% water by weight. In step 14, the dried cannabis material is pressed under a first set of temperature and pressure conditions in a first filter bag. In one non-limiting example, the first filter preferably has a first pore size between about 90 and 100 micrometers, the temperature is preferably between 175 and 225° F., most preferably about 210° F., and the pressure is preferably varied from an initial pressure of about 500 psi that is gradually increased to about 7,000 to 8,000 psi. During step 14, a liquid is release from the cannabis material and any material that is smaller than the first pore size will pass through the first filter bag. The liquid fraction released from the first filter bag is further processed, whereas the solid fraction retained within the first filter bag may be discarded or used in some other process.

In step 16, the liquid fraction released during step 14 is collected as a cannabis concentrate (also referred to as "rosin"). In step 18, the collected liquid fraction (cannabis concentrate) is placed into a second filter bag and pressed under a second set of temperature and pressure conditions. The second filter preferably has a second pore size from about 15 to 30 micrometers, the temperature is preferably above room temperature and below about 100° F., and the pressure is preferably below about 100 psi. A liquid fraction emerges through the second filter and may be discarded or used in some other process. A fractionated cannabis concentrate remaining inside the second filter bag may be collected from the second filter bag in step 20. The fractionated cannabis concentrate (also referred to as "fractionated rosin") may be provided as a product for use in one or more subsequent process, such as a process for preparing an edible product, preparing a tincture, or preparing a liquid (i.e., an e-liquid or vape juice) for use in a combustion-free inhalation system. Steps 22 and 24 provide a preferred process for preparing an edible product.

In step 22, the fractionated cannabis concentrate collected from the second filter bag is suspended in an edible oil, such as coconut oil, and then placed in a sealed container for heating. During step 22, the application of heat causes the fractionated cannabis concentrate to be decarboxylated and the use of a sealed container prevents the loss of volatile compounds until the decarboxylated fractionated cannabis concentrate has cooled. In step 24, the decarboxylated fractionated cannabis concentrate that is suspended in the edible oil is collected for use in an edible product, such as a candy or baked good. For example, the edible oil containing the fractionated cannabis concentrate may be used as an ingredient in a variety of recipes, either as an addition ingredient or as a substitute for edible oil specified in the recipe.

Figure 2:
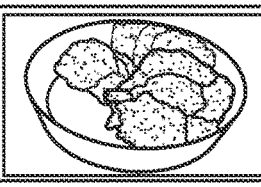
FIG. 2 shows an analysis of a cannabis starting material.

FIG. 2 is an analysis of the starting cannabis (hemp) material prior to step 12. The analysis shows that the starting cannabis material has a high level of CBD (21.808% CBD) and a very low level of THC (0.800% THC). The plant material is dried in step 12. A preferred drying process may include leaving the plant material, such as the female cannabis inflorescences, at about 68° F. and about 60% humidity for about 14 to 15 days.

In step 14, the dried cannabis material is placed inside a first filter bag having a defined pore size. A preferred first filter bag is made of nylon, such as those available from Dabpress of Trinidad, Colorado. The first filter bag may have a pore size between about 90 and 100 micrometers. A pore size less than 90 micrometers will produce a lower yield and a pore size greater than 100 micrometers will produce an excessive amount of plant matter in the cannabis concentrate. The first filter bag containing the starting cannabis material was pressed between heated platens. While the precise temperature of the heated platens may be varied depending on the characteristics of the plant material which may vary between cannabis cultivars, a temperature between 180° F. and 235° F., most preferably about 210° F., is a reasonable temperature for the pressing process. Temperatures exceeding 235° F. risk burning off desirable cannabinoids and/or terpenes.

The first press operation initially applied a pressure of about 500 psi, and the pressure was gradually increased as liquid was pressed from the plant material until a final pressure of about 8,000 psi was reached. However, as with the pressing temperature, the final pressure may be different for various cannabis cultivars due to the different chemical compounds and/or concentrations of compounds found in each cultivar. For example, the maximum final pressure for some cannabis cultivars may be about 7000 psi. The initial pressure of 500 psi is just a starting point and may, for example, be held for approximately 30 seconds before increasing the pressure gradually until reaching the maximum pressure. In one example, the entire first pressing process may be completed in about 90 seconds.

In step 16, the liquid pressed from the plant material was collected as cannabis concentrate and consisted primarily of terpenoids and cannabinoids. In a preferred, but optional step, the cannabis concentrate liquid was agitated until visible separation had occurred. A more liquid or oily substance (containing cannabinoids and terpenes) developed on the top while a more solid sugary or clumpy looking wet solid substance (heavy in THCA) became visible on the bottom. It is believed that the agitation initiates or advances the fractionation process and improves the fractionation that occurs during the second press operation in step 18.

In step 18, the cannabis concentrate is then placed into a second filter bag which has a pore size from about 15 to 40 micrometers, but most preferably from about 15 to 30 micrometers. A preferred second filter bag is made of nylon, such as a DABPRESS™ filter bag available from Dabpress Technologies of Trinidad, Colorado. The second filter bag containing the cannabis concentrate is pressed at a temperature above room temperature (70° F.) but below about 100° F. and a pressure below about 100 psi until a low viscosity ("runny") liquid emerges through the pores of the second filter bag. The actual viscosity of the liquid fraction may vary from one cannabis cultivar to another, perhaps due to differences in the compounds and/or concentrations of compounds in each cannabis cultivar. The second press operation may be started at a pressure of zero psi and the pressure of the press may be gradually increased until the liquid flows out of the second filter bag. The ideal temperature and pressure for pressing cannabis concentrate may vary according to the cannabis cultivar from which the cannabis concentrate is produced. For example, a cultivar that has a high concentration of myrcene requires a somewhat higher temperature than a cultivar that has a high concentration of limonene. A pressing temperature and pressure for a particular cultivar may be determined using one or more samples of the material from a large batch of cannabis material. For example, a sample of the cannabis plant material may be pressed under various combinations of temperature and pressure, and the terpene profiles in the liquid pressed through the second filter bag are measured. The desired objectives include increasing the THC concentration in the fractionated cannabis concentrate retained in the second filter bag, preventing the fractionated cannabis concentrate from becoming too thick to separate out of the second filter bag, and maintaining a high yield of the fractionated cannabis concentrate. These objectives can be achieved by monitoring the liquid pressed from the second filter bag to assure that this liquid remains relatively low in terpenes and cannabinoids. Once the pressure and temperature profile has been established for the sample(s) taken from a large batch of cannabis material, all of the material from the batch may use the same pressure and temperature. When the rate at which liquid emerges slows, the pressure is released.

In step 20, the fractionated cannabis concentrate remaining inside the second filter is collected. The liquid that passes through the second filter bag in step 18 contains terpenoids and may be discarded. The material remaining in the second filter bag is referred to as fractionated cannabis concentrate. The second filter bag is opened so that the fractionated cannabis concentrate may be removed from the second filter bag and collected for further processing. The fractionated cannabis concentrate removed from the second filter bag was a semi-solid having a texture not unlike that of damp sand. As the material cooled, it dried or solidified to a sticky powder consisting mostly of THC-A.

FIG. 3 shows an analysis of the fractionated cannabis concentrate collected in step 20. Whereas the starting cannabis material (per the analysis shown in FIG. 2) was high in CBD (21.808% CBD) and low in THC (0.800% THC), the fractionated cannabis concentrate was higher in THC (52.7% THC) and lower in CBD (13.8% CBD) relative to the starting cannabis material.

In step 22, the fractionated cannabis concentrate, now a crumbly THC-A material, was then decarboxylated. For edibles, such as candy, the cooled fractionated cannabis concentrate was mixed with, and suspended in, an edible carrier oil, such as coconut oil, hempseed oil, medium-chain triglycerides (MCT) oil or butter, at roughly equal weights (i.e., weight of the fractionated cannabis concentrate to weight of carrier oil) and then heated in a sealed container to between about 240° F. and about 275° F. for a period between 45 and 130 minutes, such as about 270° F. for about 50 minutes, to decarboxylate the THC-A and other cannabinoid acids which are present according to the cultivar used as a starting material. Using much less than a roughly equal weight of edible carrier oil may cause the fractionated cannabis concentrate to burn in some regions of the sealed container, whereas using much more than a roughly equal weight of edible carrier oil dilutes the product with such a high amount of the edible carrier oil that it may be undesirable for use in various recipes. After decarboxylating with heat, the sealed container was then allowed to cool before being opened to recover the decarboxylated fractionated cannabis concentrate.

The fractionation of the cannabis concentrate produces a fractionated cannabis concentrate having a significant enrichment of THC-A (which becomes THC following decarboxylation). However, the final ratio of THC to other cannabinoids may be modulated or varied by adding a portion of the (unfractionated) cannabis concentrate to the fractionated cannabis concentrate before the decarboxylation process (or after the decarboxylation process if the cannabis concentrate has been decarboxylated separately from the decarboxylation of the fractionated cannabis concentrate).

In step 24, the decarboxylated, fractionated cannabis concentrate is that is already suspended in an edible oil is collected for use in an edible product. To ensure uniformity, the mixture of the decarboxylated, fractionated cannabis concentrate and edible oil may be advantageously homogenized prior to use. The mixture may be suitably mixed using a high-speed homogenizer (e.g., a MXBAOHENG high speed emulsifier/disperser) operating at 10,000 rotations per minute (RPM). The homogenized product, which may be referred to as a "base" product, is ideal for direct addition to candy syrup for production of cannabis-infused candies.

FIG. 4 shows the analysis of candies made with the base product (i.e., decarboxylated, fractionated cannabis concentrate suspended in edible oil and homogenized). The base product or material also can be added to a recipe for a variety of baked goods.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:
   pressing dried cannabis through a first filter having a first pore size of between about 90 and 100 micrometers under a first set of temperature and pressure conditions;
   collecting a cannabis concentrate released from the dried cannabis and passed through the first filter as a result of the pressing; and
   fractionating the cannabis concentrate by pressing the cannabis concentrate through a second filter having a second pore size from about 15 to 40 micrometers under a second set of temperature and pressure conditions until a liquid emerges through the second filter leaving a fractionated cannabis concentrate on the second filter.

2. The method of claim 1, further comprising:
   suspending the fractionated cannabis concentrate in an edible carrier oil;
   placing the edible carrier oil containing the suspended fractionated cannabis concentrate in a sealed container;
   heating the edible carrier oil containing the suspended fractionated cannabis concentrate in the sealed container until the fractionated cannabis concentrate is decarboxylated; and
   allowing the decarboxylated fractionated cannabis concentrate to cool in the sealed container before opening the sealed container.

3. The method of claim 2, further comprising:
   mixing an amount of unfractionated cannabis concentrate into the fractionated cannabis concentrate prior to suspending the fractionated cannabis concentrate in the edible carrier oil.

4. The method of claim 2, wherein the sealed container of edible carrier oil containing the suspended fractionated cannabis concentrate is heated to a temperature between about 240° F. and about 275° F. for a period between 45 and 130 minutes.

5. The method of claim 2, wherein the sealed container of edible carrier oil containing the suspended fractionated cannabis concentrate is heated to a temperature of about 270° F. for about 50 minutes.

6. The method of claim 2, wherein the edible carrier oil is coconut oil.

7. The method of claim 2, further comprising:
   mixing the edible carrier oil containing the decarboxylated, fractionated cannabis concentrate into a candy syrup; and
   forming candy using the mixture of the candy syrup and the edible carrier oil containing the decarboxylated, fractionated cannabis concentrate.

8. The method of claim 2, further comprising:
   preparing a baked good including the edible carrier oil containing the decarboxylated, fractionated cannabis concentrate.

9. The method of claim 2, further comprising:
   homogenizing a mixture of the decarboxylated, fractionated cannabis concentrate and the edible oil; and
   preparing a baked good including the homogenized mixture.

10. The method of claim 1, further comprising:
    preparing the dried cannabis by drying female cannabis inflorescences to a water content between 10 and 15 weight percent.

11. The method of claim 1, wherein the first filter is a first filter bag.

12. The method of claim 11, wherein the second filter is a second filter bag.

13. The method of claim 12, wherein the first and second filter bags are made of nylon.

14. The method of claim 12, wherein pressing the dried cannabis includes pressing the dried cannabis between a pair of heated platens, and wherein pressing the cannabis concentrate includes pressing the cannabis concentrate between a pair of heated platens.

15. The method of claim 1, wherein the first set of temperature and pressure conditions include a temperature of about 210° F., an initial pressure of about 500 psi, and a gradual increase in pressure to about 8,000 psi.

16. The method of claim 1, wherein the second set of temperature and pressure conditions include a temperature above room temperature and below about 100° F. and a pressure below about 100 psi.

17. The method of claim 1, further comprising:
    agitating the cannabis concentrate to cause at least partial separation of the cannabis concentrate into a liquid and a wet solid prior to fractionating the cannabis concentrate by pressing the cannabis concentrate through the second filter.

18. The method of claim 17, further comprising:
    suspending the fractionated cannabis concentrate in an edible carrier oil;
    placing the edible carrier oil containing the suspended fractionated cannabis concentrate in a sealed container;
    heating the edible carrier oil containing the suspended fractionated cannabis concentrate in the sealed container until the fractionated cannabis concentrate is decarboxylated; and
    allowing the decarboxylated fractionated cannabis concentrate to cool in the sealed container before opening the sealed container.

* * * * *